United States Patent
Kray et al.

(10) Patent No.: US 10,927,703 B2
(45) Date of Patent: Feb. 23, 2021

(54) CIRCUMFERENTIALLY VARYING THICKNESS COMPOSITE FAN CASING

(71) Applicant: General Electric Company, Schenectady, NY (US)

(72) Inventors: Nicholas Joseph Kray, Mason, OH (US); Benjamin James Roby, Fairfield, OH (US); Vijesh Shetty Anangoor, Kannamangla (IN); Nitesh Jain, Seetarampalya (IN); Sreekanth Kumar Dorbala, Hoodi (IN); Nagamohan Govinahalli Prabhakar, Vijayanagar (IN); K Phani SriKrishna Chinnapragada, Hagadur Whitefield (IN)

(73) Assignee: General Electric Company, Schenectady, NY (US)

( * ) Notice: Subject to any disclaimer, the term of this patent is extended or adjusted under 35 U.S.C. 154(b) by 118 days.

(21) Appl. No.: 15/705,712

(22) Filed: Sep. 15, 2017

(65) Prior Publication Data
US 2018/0080339 A1 Mar. 22, 2018

(51) Int. Cl.
*F01B 25/16* (2006.01)
*F01D 21/04* (2006.01)
(Continued)

(52) U.S. Cl.
CPC .............. *F01D 21/045* (2013.01); *F02C 7/04* (2013.01); *F01D 25/24* (2013.01);
(Continued)

(58) Field of Classification Search
CPC .......... F01D 21/045; F01D 25/24; F02C 7/04; F05D 2250/182; F05D 2250/232; F05D 2250/283; F05D 2300/603; Y02T 50/672
(Continued)

(56) References Cited

U.S. PATENT DOCUMENTS 153,456 A   7/1874 Paine
167,209 A   8/1875 Yates et al.
(Continued)

FOREIGN PATENT DOCUMENTS

CN   1680684 A    10/2005
CN   101107424 A   1/2008
(Continued)

OTHER PUBLICATIONS

Chinese Office Action Corresponding to CN Application No. 2017108326563 dated Mar. 21, 2019.

*Primary Examiner* — Hung Q Nguyen
*Assistant Examiner* — Anthony Donald Taylor, Jr.
(74) *Attorney, Agent, or Firm* — Dority & Manning, P.A.

(57) ABSTRACT

Fan blade containment system includes a composite fan case with an annular composite shell extending from forward flange downstream to aft flange, and circumferentially varying thickness portion of composite shell. Annular composite back sheet spaced radially outwardly of annular composite shell has annular filler layer disposed radially therebetween. Annular forward and aft seams between annular composite shell and composite back sheet may axially trap filler layer. Circumferentially varying thickness portion may include aftwardly extending fingers of composite back sheet in aft seam and first thickness of fingers thicker than second thickness of composite shell circumferentially between fingers. Composite shell may extend from forward flange to aft flange. Aft flange bolted to metallic flange of metallic fan casing aft of aft flange. Containment system may circumscribe and surround fan and fan blades of gas turbine engine fan section.

14 Claims, 6 Drawing Sheets

(51) Int. Cl.
*F02C 7/04* (2006.01)
*F01D 25/24* (2006.01)

(52) U.S. Cl.
CPC .. *F05D 2250/182* (2013.01); *F05D 2250/232* (2013.01); *F05D 2250/283* (2013.01); *F05D 2300/603* (2013.01); *Y02T 50/60* (2013.01)

(58) Field of Classification Search
USPC .......................................................... 415/9
See application file for complete search history.

(56) References Cited

U.S. PATENT DOCUMENTS

| | | | | |
|---|---|---|---|---|
| 4,484,856 A * | 11/1984 | Patacca | ................ | F01D 21/045 138/110 |
| 4,534,698 A * | 8/1985 | Tomich | ................ | F01D 21/045 415/121.2 |
| 4,547,122 A * | 10/1985 | Leech | ................ | F01D 21/045 415/121.2 |
| 5,160,248 A * | 11/1992 | Clarke | ................ | F01D 21/045 156/276 |
| 5,188,505 A * | 2/1993 | Schilling | ............... | F01D 21/045 415/200 |
| 5,226,789 A * | 7/1993 | Donges | ................ | F01D 9/042 415/173.4 |
| 5,273,393 A | 12/1993 | Jones et al. | | |
| 5,336,044 A * | 8/1994 | Forrester | ............... | F01D 21/045 415/196 |
| 5,344,280 A * | 9/1994 | Langenbrunner | ..... | F01D 21/045 415/119 |
| 5,437,538 A * | 8/1995 | Mitchell | ............... | F01D 21/045 415/200 |
| 5,486,086 A * | 1/1996 | Bellia | ................ | F01D 21/045 415/9 |
| 5,516,257 A * | 5/1996 | Kasprow | ............... | F01D 21/045 415/200 |
| 5,823,739 A * | 10/1998 | Van Duyn | ............. | F01D 21/045 415/9 |
| 6,053,696 A | 4/2000 | Roberts | | |
| 6,113,347 A * | 9/2000 | Forrester | ............... | F01D 21/045 415/173.4 |
| 6,497,550 B2 * | 12/2002 | Booth | ................ | F01D 21/045 415/173.4 |
| 6,829,883 B2 * | 12/2004 | Sathianathan | ........ | F01D 21/045 403/150 |
| 6,979,172 B1 * | 12/2005 | Mackenzie | ........... | F01D 21/045 415/173.3 |
| 7,018,168 B2 * | 3/2006 | Worthoff | ............... | F01D 21/045 415/9 |
| 7,338,250 B2 * | 3/2008 | Martindale | ............ | F01D 21/045 415/119 |
| 7,735,833 B2 * | 6/2010 | Braun | ................... | F01D 11/003 277/301 |
| 8,021,102 B2 * | 9/2011 | Xie | ........................ | B29C 70/086 415/9 |
| 8,167,546 B2 * | 5/2012 | Shi | ........................... | F01D 9/04 415/173.1 |
| 8,425,178 B2 * | 4/2013 | Lenk | ........................ | F01D 21/045 415/173.1 |
| 8,454,298 B2 | 6/2013 | Cardarella, Jr. | | |
| 8,672,609 B2 * | 3/2014 | Lussier | ................. | F01D 21/045 415/197 |
| 8,684,689 B2 * | 4/2014 | Guo | ........................ | F01D 9/04 415/213.1 |
| 8,966,754 B2 | 3/2015 | Xie | | |
| 8,986,797 B2 | 3/2015 | Xie | | |
| 9,249,681 B2 | 2/2016 | Robertson, Jr. et al. | | |
| 9,677,570 B2 * | 6/2017 | Care | ..................... | F01D 21/045 |
| 9,835,046 B2 * | 12/2017 | Reed | ...................... | F01D 21/045 |
| 10,337,352 B2 | 7/2019 | Dubois et al. | | |
| 2004/0146393 A1 * | 7/2004 | Evans | ..................... | B29C 33/40 415/9 |
| 2009/0155065 A1 * | 6/2009 | Xie | ........................ | F01D 11/122 415/200 |
| 2010/0111675 A1 * | 5/2010 | Wojtyczka | ............ | F04D 29/023 415/119 |
| 2011/0052383 A1 * | 3/2011 | Lussier | ................. | F01D 21/045 415/200 |
| 2011/0286839 A1 * | 11/2011 | Wojtyczka | ............ | F01D 21/045 415/173.4 |
| 2012/0020782 A1 * | 1/2012 | Rice | ......................... | F02C 7/04 415/214.1 |
| 2012/0099981 A1 * | 4/2012 | Verseux | ................ | F01D 21/045 415/200 |
| 2012/0134774 A1 * | 5/2012 | Clark | .................. | B65D 43/0222 415/9 |
| 2013/0153456 A1 * | 6/2013 | Zhu | ......................... | B29C 70/08 206/521 |
| 2014/0212273 A1 | 7/2014 | LeBorgne | | |
| 2014/0255152 A1 * | 9/2014 | Totten | .................... | F01D 25/24 415/9 |
| 2015/0016945 A1 * | 1/2015 | Kappes | ................. | F01D 21/045 415/1 |
| 2015/0308290 A1 * | 10/2015 | Kappes | ................... | F01D 25/24 415/119 |
| 2016/0069214 A1 * | 3/2016 | Engebretsen | ......... | F01D 21/045 415/196 |
| 2016/0312795 A1 | 10/2016 | Crall | | |

FOREIGN PATENT DOCUMENTS

| | | |
|---|---|---|
| CN | 103124834 A | 5/2013 |
| CN | 103620165 A | 3/2014 |
| CN | 105431615 A | 3/2016 |
| CN | 105814285 A | 7/2016 |

\* cited by examiner

CIRCUMFERENTIALLY VARYING THICKNESS COMPOSITE FAN CASING

BACKGROUND OF THE INVENTION

Technical Field

The present invention relates to gas turbine engine fan blade casings and, more specifically, to composite fan blade containment casings.

BACKGROUND INFORMATION

Aircraft gas turbine engines operate in various conditions and foreign objects may be ingested into the engine. During operation of the engine and, in particular, during movement of an aircraft powered by the engine, the fan blades may be impacted and damaged by foreign objects such as, for example, birds or debris picked up on a runway. Impacts on the blades may damage the blades and result in blade fragments or entire blades being dislodged and flying radially outward at relatively high velocity.

To limit or minimize consequential damage, some known engines include a metallic or composite casing or shell to facilitate increasing a radial and an axial stiffness of the engine and to facilitate reducing stresses near the engine casing penetration. Composite fan casings for a gas turbine engine have been developed such as those disclosed in U.S. Pat. No. 7,246,990 to Xie, et al., which issued Jul. 24, 2007 and is assigned to the present assignee, General Electric Company.

Composite fan cases and shells are subject to damage due to strains induced during large applied loads such as fan blade-out (FBO). Such damage can propagate to an extended 360 degree crack. Thus, it is highly desirable to provide a composite containment shell or casing operable to limit damage during FBO and it is highly desirable that such damage does not propagate to an extended 360 degree crack.

BRIEF DESCRIPTION OF THE INVENTION

A fan blade containment system includes a composite fan case with an annular composite shell extending from a forward flange aft or downstream to an aft flange and a circumferentially varying thickness portion of the composite fan case including the composite shell.

Annular forward and aft seams may be between the annular composite shell and a composite back sheet. The circumferentially varying thickness portion of the composite fan case may include aftwardly or downstream extending lobes or fingers of the composite back sheet on the composite shell in the aft seam. The circumferentially varying thickness portion may include a first thickness of the lobes or fingers thicker than a second thickness of the composite shell circumferentially between the lobes or fingers.

An annular composite back sheet may be spaced radially outwardly of the annular composite shell and an annular filler layer, honeycomb for example, may be disposed radially therebetween. Annular forward and aft seams between the annular composite shell and composite back sheet may axially trap the filler layer between the forward and aft seams. The circumferentially varying thickness portion of the composite fan case may include aftwardly or downstream extending lobes or fingers of the composite back sheet on the composite shell in the aft seam. A first thickness of the lobes or fingers may be thicker than a second thickness of the composite shell circumferentially between the lobes or fingers.

A fan case assembly includes a metallic fan casing aft or downstream of and bolted to a composite fan case having an annular composite shell extending from a forward flange aft or downstream to an aft flange. The metallic fan casing includes a metallic fan casing flange bolted to the aft flange and a circumferentially varying thickness portion of the composite fan case including the composite shell. An annular composite back sheet may be spaced radially outwardly of the annular composite shell and an annular filler layer disposed radially therebetween. The filler layer may include honeycomb. Annular forward and aft seams between the annular composite shell and composite back sheet may axially trap the filler layer between the forward and aft seams. The circumferentially varying thickness portion of the composite fan case may include aftwardly or downstream extending lobes or fingers of the composite back sheet on the composite shell in the aft seam and a first thickness of the lobes or fingers thicker than a second thickness of the composite shell circumferentially between the lobes or fingers.

A gas turbine engine fan section includes a fan section with a fan, a fan case assembly surrounding the fan and including a metallic fan casing aft or downstream of and bolted to a composite fan case, and a fan blade containment system including the composite fan case circumscribing and surrounding the fan and the fan blades. The composite fan case includes an annular composite shell extending from a forward flange aft or downstream to an aft flange, the metallic fan casing includes a metallic fan casing flange bolted to the aft flange, and a circumferentially varying thickness portion of the composite fan case includes the composite shell.

The gas turbine engine fan section may further include an annular composite back sheet spaced radially outwardly of the annular composite shell and an annular filler layer disposed radially therebetween. Annular forward and aft seams between the annular composite shell and composite back sheet may axially trap the filler layer between the forward and aft seams. The circumferentially varying thickness portion of the composite fan case may include aftwardly or downstream extending lobes or fingers of the composite back sheet on the composite shell in the aft seam and a first thickness of the lobes or fingers thicker than a second thickness of the composite shell circumferentially between the lobes or fingers. An annular layer of Kevlar may cover the annular composite back sheet covering and surrounding the composite back sheet.

DETAILED DESCRIPTION OF THE INVENTION

Figure 1:
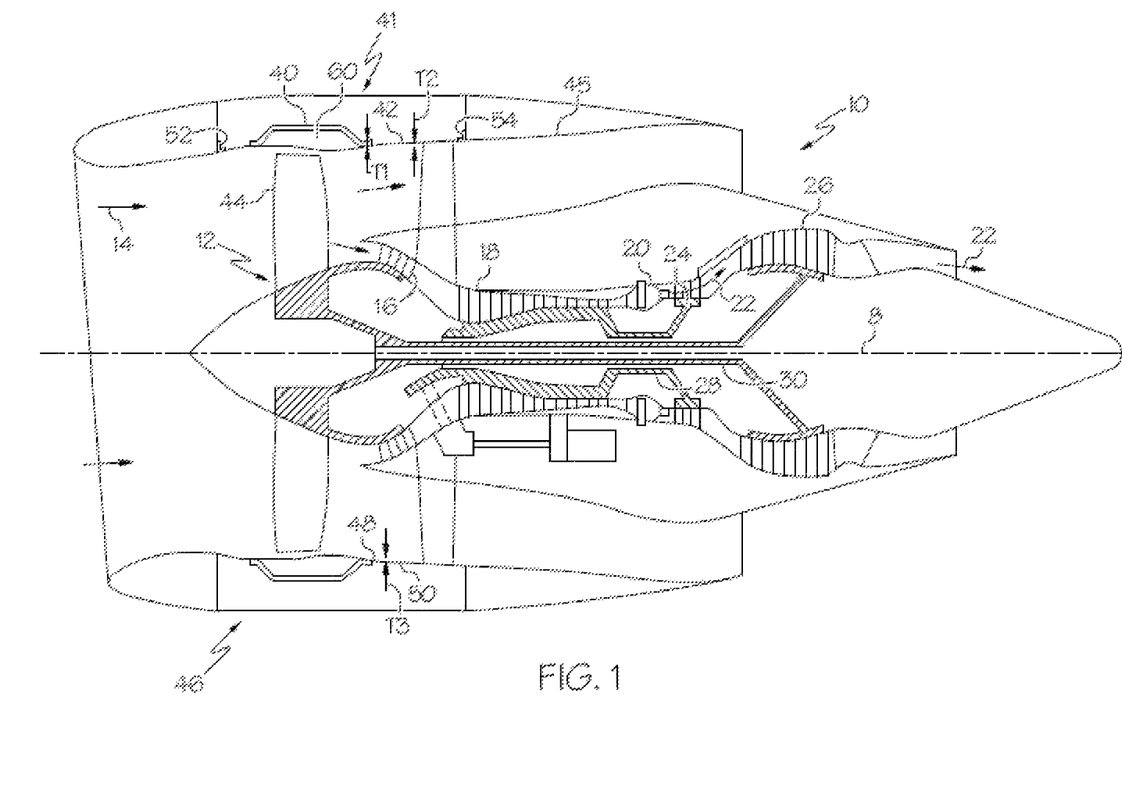
FIG. 1 is schematic cross-sectional illustration of a gas turbine engine including a composite fan composite casing and inner shell with circumferential varying thickness.

Illustrated schematically in FIG. 1 is an exemplary turbofan gas turbine engine 10 circumscribed about a centerline axis 8. The engine 10 includes, in downstream flow relationship, a fan 12 which receives ambient air 14, a low pressure or booster compressor 16, a high pressure compressor (HPC) 18, a combustor 20 which mixes fuel with the air 14 pressurized by the HPC 18 for generating combustion gases 22 which flow downstream through a high pressure turbine (HPT) 24, and a low pressure turbine (LPT) 26 from which the combustion gases 22 are discharged from the engine 10. A first or high pressure shaft 28 joins the HPT 24 to the HPC 18, and a second or low pressure shaft 30 joins the LPT 26 to both the fan 12 and the low pressure compressor 16.

A fan section 46 of the engine 10 includes the fan 12 and a fan case assembly 41 with a composite fan case 42 circumscribing and surrounding fan blades 44 of the fan 12. The fan case assembly 41 further included a metallic fan casing 45 aft or downstream of and bolted to the composite fan case 42. A fan blade containment system 40 circumscribes and surrounds the fan 12 and the fan blades 44 to retain any fan blades 44 or fan blade fragments dislodged from the engine fan 12. A "blade-out event" arises when a fan blade or portion thereof is accidentally released from a rotor of a high-bypass turbofan engine. When suddenly released during flight, a fan blade can impact a surrounding fan case with substantial force, and resulting loads on the fan case can cause circumferential cracking of the fan case.

Figure 2:
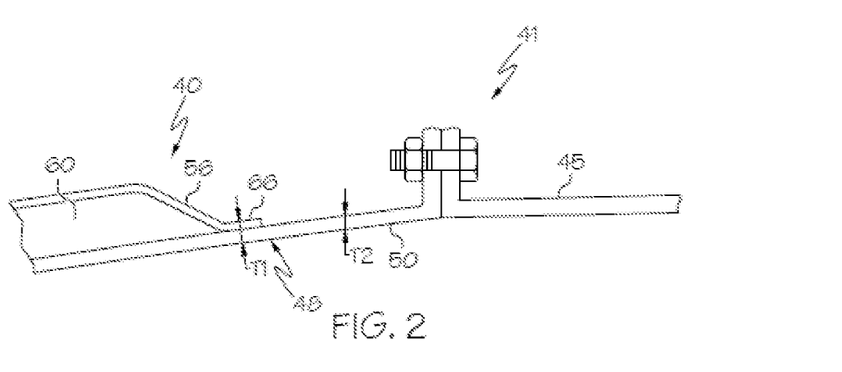
FIG. 2 is an enlarged cross-sectional illustration of back sheet and face sheet used for the circumferential varying thickness of the composite inner shell illustrated in FIG. 1.
Figure 3:
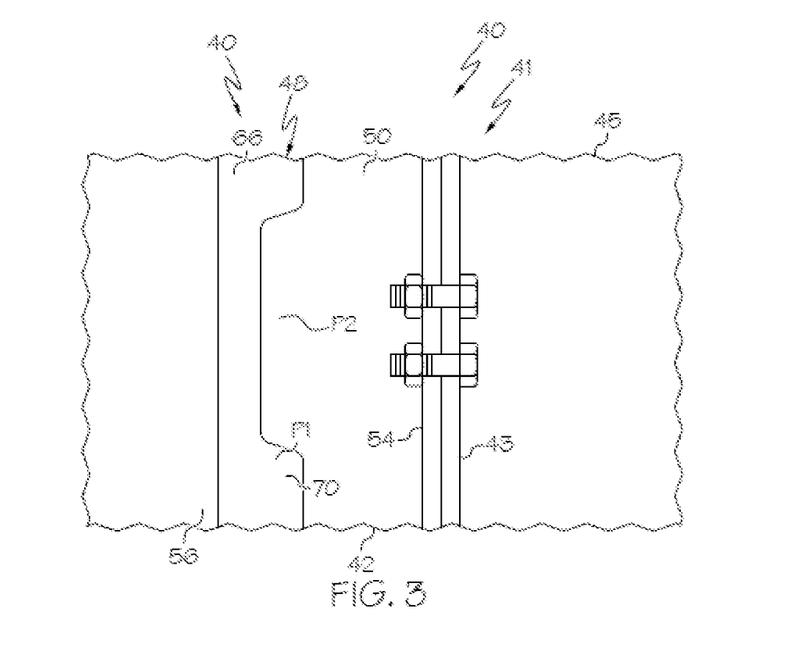
FIG. 3 is a schematic side view illustration of the back sheet and the face sheet in the circumferential varying thickness composite shell illustrated in FIG. 2.
Figure 4:
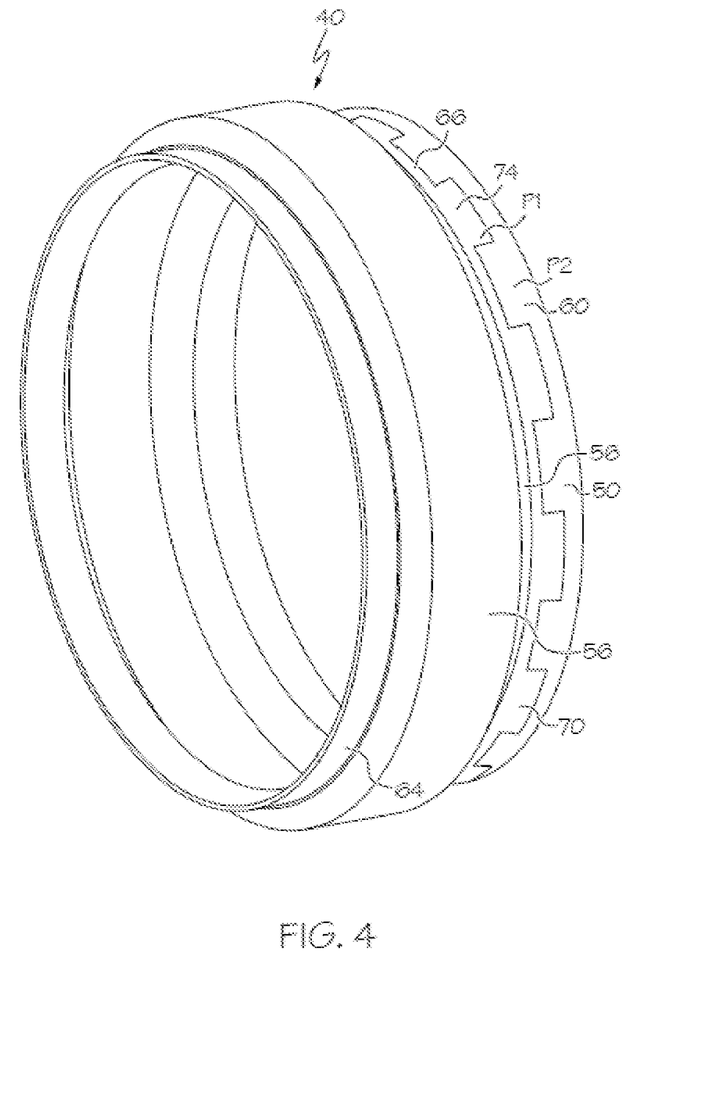
FIG. 4 is a schematic perspective view illustration of the composite shell illustrated in FIG. 3.
Figure 5:
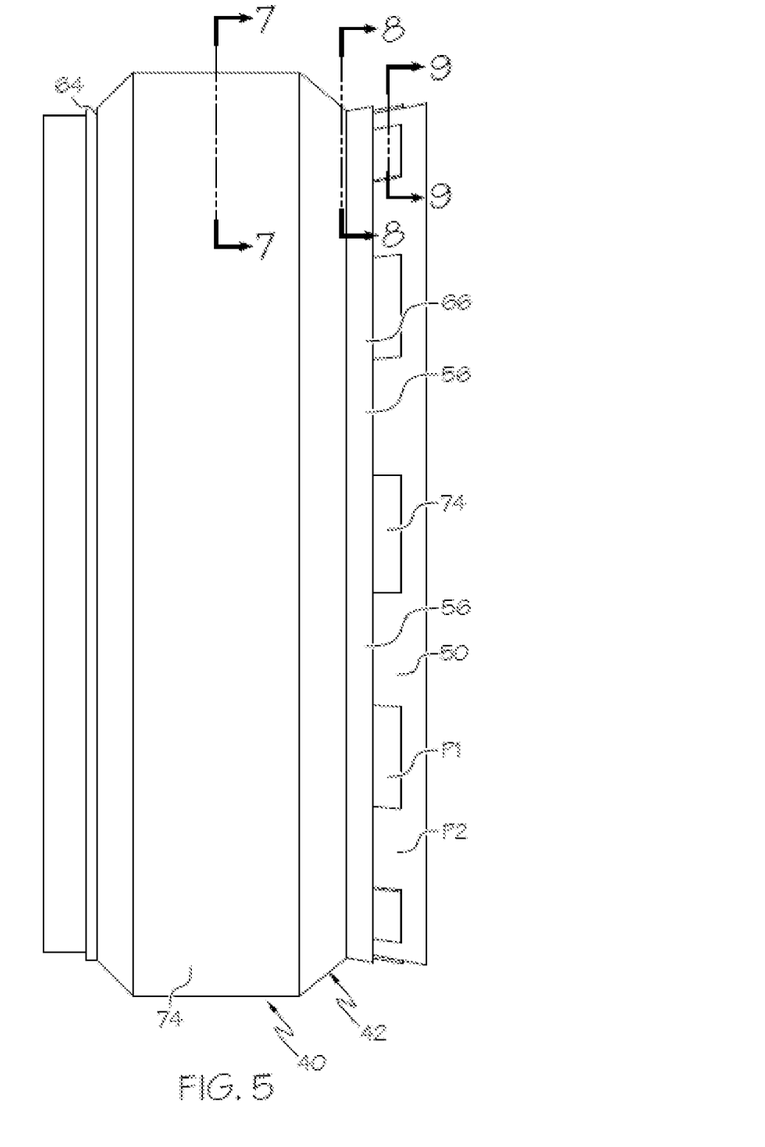
FIG. 5 is a schematic side view illustration of the composite shell illustrated in FIG. 4 wrapped in Kevlar.
Figure 6:
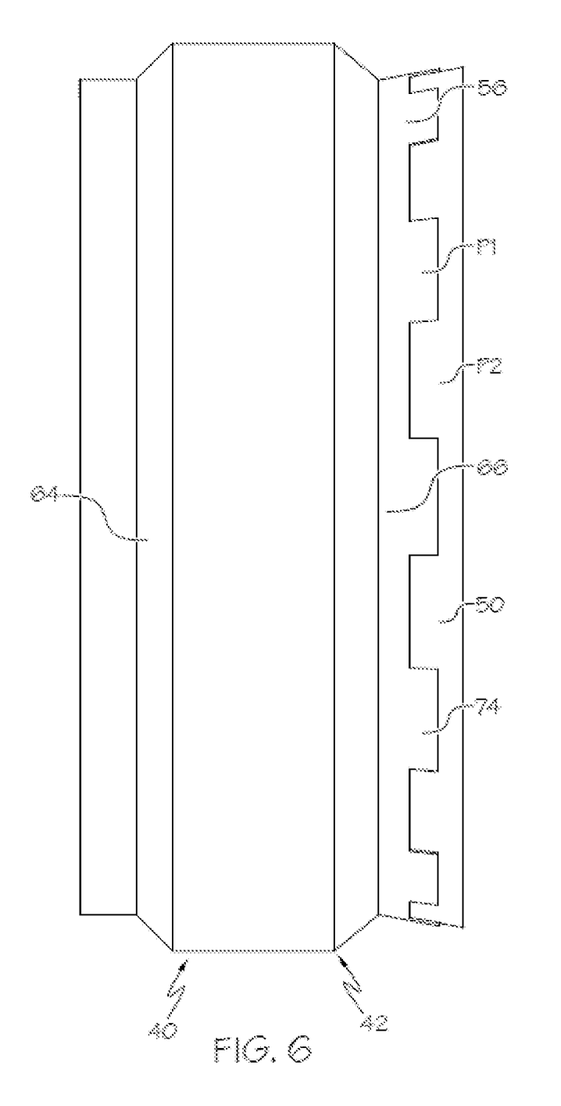
FIG. 6 is a schematic side view illustration of the composite shell without the Kevlar wrap illustrated in FIG. 5.

FIGS. 1-3 illustrate the fan blade containment system 40 includes the composite fan case 42 circumscribing the fan blades 44. The fan blade containment system 40 includes a circumferentially varying thickness T portion 48 of the composite fan case 42. The composite material of the fan case 42 is a lightweight and high-strength material. The circumferentially varying thickness T around the composite fan case 42 is designed to guide strains induced during large applied loads, such as, during fan blade-out (FBO) events. It is highly beneficial during an FBO event to drive subsequent case damage progression to areas of intended reinforcement such as a metallic fan casing flange 43 of the metallic fan casing 45. An exemplary circumferentially varying thickness T is illustrated by first and second thicknesses T1 and T2 at first and second circumferential positions P1, P2 respectively.

Referring to FIGS. 3-6, the composite fan case 42 is annular and includes an annular composite shell 50 extending from a forward flange 52 aft or downstream to an aft flange 54. The composite shell's aft flange 54 is bolted to the metallic fan casing flange 43 of the metallic fan casing 45. An annular composite back sheet 56 is spaced radially outwardly of the annular composite shell 50 and surrounds the fan blades 44. An annular filler layer 60, such as honeycomb, is disposed between the annular composite shell 50 and the composite back sheet 56. The annular filler layer 60 is axially trapped between annular forward and aft seams 64, 66 between the annular composite shell 50 and composite back sheet 56. As illustrated in FIGS. 4, 5, 7, and 8, an annular layer of Kevlar 74 may cover and surround the annular composite back sheet 56 surrounding the fan blades 44.

Figure 7:
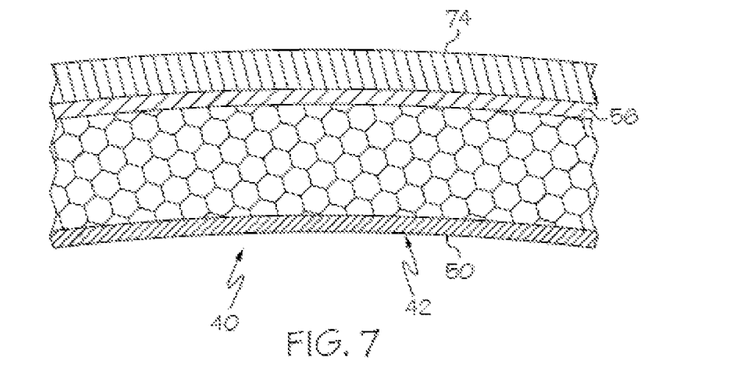
FIG. 7 is a schematic axial cross-sectional view through 7-7 in FIG. 6.
Figure 8:
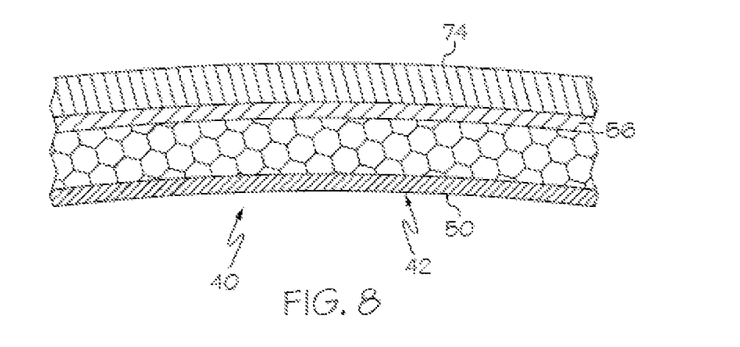
FIG. 8 is a schematic axial cross-sectional view through 8-8 in FIG. 6.
Figure 9:
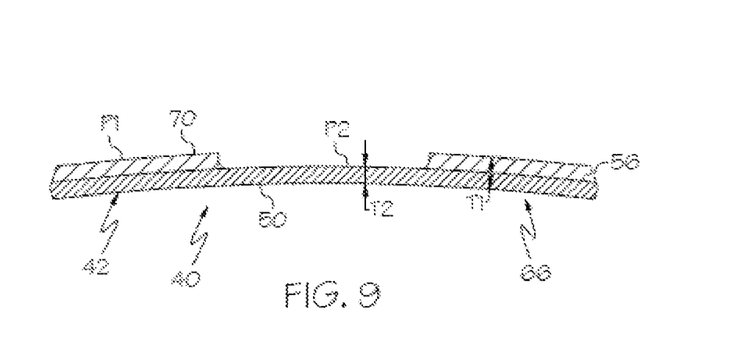
FIG. 9 is a schematic axial cross-sectional view through 9-9 in FIG. 6.

The aft seams 66 includes aftwardly or downstream extending lobes or fingers 70 of the composite back sheet 56. The annular composite shell 50 contacts and is bonded to the composite back sheet 56, as illustrated in FIGS. 7 and 8, along the forward and aft seams 64, 66. This provides the circumferentially varying thickness T portion 48 of the composite fan case 42 in which the thicker first thickness T1 is that of the combined annular composite shell 50 and composite back sheet 56. The thinner second thickness T2 is that of just the composite shell 50 circumferentially between the lobes or fingers 70 of the composite back sheet 56 in the circumferentially varying thickness T portion 48 as illustrated in FIG. 9.

The circumferentially varying thickness T portion 48 of the composite fan case 42 can arrest circumferential cracks in the composite portion of the case and subsequent damage can be directed to metallic regions, outside of the primary composite containment region, where metallic reinforcement is available to arrest the crack and prevent circumferential composite case failure. The containment shell is designed to withstand damage during FBO, this design helps insure that damage does not propagate to an extended 360 degree crack.

The circumferentially varying thickness T of the composite shell makes for a torturous path for any crack propagation to happen. Thus, any propagation can be 'steered' axially to a region that has added reinforcements such as the metallic fan casing flange 43 of the metallic fan casing 45.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. A fan blade containment system comprising:
   a composite fan case,
   the composite fan case including an annular composite shell extending from a forward flange downstream to an aft flange,
   the composite fan case comprising a circumferentially varying thickness portion, the circumferentially varying thickness portion including a first thickness portion and a second thickness portion, and
   an annular composite back sheet spaced radially outwardly of the annular composite shell, a filler layer disposed radially between the annular composite back sheet and the annular composite shell, and a layer of Kevlar disposed radially outwardly of the annular composite back sheet,
   wherein the circumferentially varying thickness portion comprises downstream extending fingers of the annular composite back sheet at an aftmost portion of the annular composite back sheet, such that the first thickness portion includes the annular composite shell, the filler layer, the annular composite back sheet, and the layer of Kevlar, and the second thickness portion includes only the annular composite shell.

2. The fan blade containment system as claimed in claim 1, further comprising annular forward and aft seams between the annular composite shell and the annular composite back sheet axially trapping the filler layer between the forward and aft seams.

3. The fan blade containment system as claimed in claim 2, further comprising a metallic fan casing including a metallic fan casing flange connected to the aft flange.

4. The fan blade containment system as claimed in claim 1, wherein the filler layer includes honeycomb.

5. The fan blade containment system as claimed in claim 4, further comprising annular forward and aft seams between the annular composite shell and the annular composite back sheet axially trapping the honeycomb between the forward and aft seams.

6. The fan blade containment system as claimed in claim 5, further comprising a metallic fan casing including a metallic fan casing flange connected to the aft flange.

7. A fan case assembly comprising:
a metallic fan casing downstream of and bolted to a composite fan case, the metallic fan casing including a metallic fan casing flange connected to an aft flange,
the composite fan case including an annular composite shell extending from a forward flange downstream to the aft flange,
the composite fan case comprising a circumferentially varying thickness portion, the circumferentially varying thickness portion including a first thickness portion and a second thickness portion, and
an annular composite back sheet spaced radially outwardly of the annular composite shell, a filler layer disposed radially between the annular composite back sheet and the annular composite shell, and a layer of Kevlar disposed radially outwardly of the annular composite back sheet,
wherein the circumferentially varying thickness portion comprises downstream extending fingers of the annular composite back sheet at an aftmost portion of the annular composite back sheet, such that the first thickness portion includes the annular composite shell, the filler layer, the annular composite back sheet, and the layer of Kevlar,
and the second thickness portion includes only the annular composite shell.

8. The fan case assembly as claimed in claim 7, wherein the filler layer includes honeycomb.

9. The fan case assembly as claimed in claim 7, further comprising annular forward and aft seams between the annular composite shell and the annular composite back sheet axially trapping the filler layer between the forward and aft seams.

10. The fan case assembly as claimed in claim 8, further comprising annular forward and aft seams between the annular composite shell and the annular composite back sheet axially trapping the honeycomb between the forward and aft seams.

11. A gas turbine engine comprising:
a fan section including a fan,
a fan case assembly surrounding the fan and including a metallic fan casing downstream of and connected to a composite fan case, the metallic fan casing including a metallic fan casing flange bolted to an aft flange,
a fan blade containment system including the composite fan case circumscribing and surrounding the fan,
the composite fan case including an annular composite shell extending from a forward flange downstream to the aft flange,
the composite fan case comprising a circumferentially varying thickness portion, the circumferentially varying thickness portion including a first thickness portion and a second thickness portion, and
an annular composite back sheet spaced radially outwardly of the annular composite shell, a filler layer disposed radially between the annular composite back sheet and the annular composite shell, and a layer of Kevlar disposed radially outwardly of the annular composite back sheet,
wherein the circumferentially varying thickness portion comprises downstream extending fingers of the annular composite back sheet at an aftmost portion of the annular composite back sheet, such that the first thickness portion includes the annular composite shell, the filler layer, the annular composite back sheet, and the layer of Kevlar,
and the second thickness portion includes only the annular composite shell.

12. The gas turbine engine as claimed in claim 11, wherein the filler layer includes honeycomb.

13. The gas turbine engine as claimed in claim 11, further comprising annular forward and aft seams between the annular composite shell and the annular composite back sheet axially trapping the filler layer between the forward and aft seams.

14. The gas turbine engine as claimed in claim 12, further comprising annular forward and aft seams between the annular composite shell and the annular composite back sheet axially trapping the honeycomb between the forward and aft seams.

\* \* \* \* \*